United States Patent
Hegenbart et al.

(10) Patent No.: US 12,381,234 B2
(45) Date of Patent: Aug. 5, 2025

(54) BIPOLAR PLATE FOR A FUEL CELL FOR GENERATION OF ELECTRICAL POWER

(71) Applicant: Airbus Operations GmbH, Hamburg (DE)

(72) Inventors: Matthias Hegenbart, Hamburg (DE); Peter Linde, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 404 days.

(21) Appl. No.: 17/981,645

(22) Filed: Nov. 7, 2022

(65) Prior Publication Data

US 2023/0140875 A1    May 11, 2023

(30) Foreign Application Priority Data

Nov. 9, 2021    (EP) .................................... 21207287

(51) Int. Cl.
*H01M 8/04089* (2016.01)
*H01B 12/16* (2006.01)
(Continued)

(52) U.S. Cl.
CPC ........ *H01B 8/04089* (2013.01); *H01B 12/16* (2013.01); *H01M 4/8621* (2013.01); *H01M 4/8631* (2013.01); *H01M 8/04007* (2013.01); *H01M 8/04201* (2013.01); *H01M 2004/8694* (2013.01)

(58) Field of Classification Search
CPC ........... H01M 8/04089; H01M 4/8621; H01M 4/8631; H01M 8/04007; H01M 8/04201; H01M 8/04014; H01M 8/04223; H01M 8/04753; H01M 8/0258; H01M 8/0202;
(Continued)

(56) References Cited

U.S. PATENT DOCUMENTS

| | | | |
|---|---|---|---|
| 5,817,221 A | 10/1998 | Leddy et al. | |
| 2004/0018400 A1 | 1/2004 | Herman | |

(Continued)

FOREIGN PATENT DOCUMENTS

| | | |
|---|---|---|
| CN | 112 331 891 A | 2/2021 |
| JP | S6191876 A | 5/1986 |

OTHER PUBLICATIONS

European Search Report for Application No. 21207287 dated May 30, 2022.

*Primary Examiner* — Stewart A Fraser
(74) *Attorney, Agent, or Firm* — KDW Firm PLLC

(57) ABSTRACT

A bipolar plate for a fuel cell for generation of electrical power has a bipolar plate body having a first surface. The bipolar plate body has at least one gas flow channel on the first surface, the gas flow channel defining a first gas flow channel side wall and an opposite second gas flow channel side wall, and the gas flow channel running in a first direction to expose the electrode to the reactant. The bipolar plate also has at least one electrical conductor to run at least partly parallel to the first direction within the bipolar plate body behind the first gas flow channel side wall and/or the second gas flow channel side wall, such that, when a voltage is applied to the electrical conductor, the electrical conductor forms an electromagnetic field, the electromagnetic field to accelerate the reactant at least partly in the direction of the electrode.

20 Claims, 5 Drawing Sheets

(51) Int. Cl.
  *H01M 4/86*   (2006.01)
  *H01M 8/04007*   (2016.01)
  *H01M 8/04082*   (2016.01)

(58) Field of Classification Search
  CPC ............. H01M 8/0297; H01M 8/2457; H01M 8/2465; H01B 12/16
  See application file for complete search history.

(56) References Cited

U.S. PATENT DOCUMENTS

2012/0034498 A1* 2/2012 Hsu ................... H01M 8/0228
          429/10
2021/0384528 A1* 12/2021 Warta ................. H01M 8/0206

* cited by examiner

BIPOLAR PLATE FOR A FUEL CELL FOR GENERATION OF ELECTRICAL POWER

TECHNICAL FIELD

The disclosure herein relates to a bipolar plate for a fuel cell for generation of electrical power. More particularly, the present description relates to a fuel cell, to a fuel cell stack, to a manufacturing method, especially an additive manufacturing method, for production of a bipolar plate, to a method of operating a fuel cell and to an aircraft having a fuel cell.

BACKGROUND

A fuel cell, also called galvanic cell, converts the energy of chemical reaction of a continuously supplied fuel, generally hydrogen as reactant, and an oxidant to electrical energy. For this purpose, fuel cells have bipolar plates as electrode with an engraved gas flow channel structure for defined conduction of the reactant. The flow of a reactant from the gas channels into a bipolar plate is dependent on the pressure in the gas flow channel, on the cross-sectional shape of the gas flow channel, and on the area which is exposed to the electrode. In various applications, it is important to be able to vary the power of the fuel cell. It is possible here, for example, to vary the gas flow, for example by a variation in the pressure of the hydrogen gas on the anode side. Alternatively or additionally, the air can be replaced by pure oxygen to a different degree on the cathode side. The rapid response behavior of a fuel cell is very important, for example, for aviation applications, for example in the event that a restart is necessary shortly before touchdown, and has been the subject of research for many years.

It would be desirable to supplement the abovementioned options, all of which are measures outside the fuel cell, with additional measures for controlling the power of a fuel cell, specifically by measures disposed within the fuel cell.

SUMMARY

An object herein is providing a fuel cell that provides the abovementioned potential for improvement.

This object is achieved by the subject-matter and embodiments disclosed herein.

In a first aspect, a bipolar plate for a fuel cell for generation of electrical current is specified. The bipolar plate has a bipolar plate body having a first surface, wherein the bipolar plate body is set up to be in contact with an electrode via the first surface. The bipolar plate body has at least one gas flow channel on the first surface, wherein the first gas flow channel defines a first gas flow channel side wall and an opposite second gas flow channel side wall. The gas flow channel runs in a first direction and is intended to expose the electrode to the reactant. The bipolar plate also has at least one electrical conductor, wherein the at least one electrical conductor is set up to run at least partly parallel to the first direction within the bipolar plate body beyond the first gas flow channel side wall and/or the second gas flow channel side wall, in such a way that, when a voltage is applied to the electrical conductor, the electrical conductor forms an electromagnetic field, the electromagnetic field being intended to accelerate the reactant at least partly in the direction of the electrode.

The electromagnetic field here, by virtue of the acceleration of the reactant, can improve the speed of control over the fuel cell power. In addition, the electromagnetic field acts directly since it is present directly within the gas flow channel. In addition, the electromagnetic field can help to generate a time-limited peak power of the fuel cell, which is advantageous, for example, in critical situations.

The most important components for the construction of a fuel cell are the bipolar plates and the membrane-electrode assembly. They are multifunctional components that are responsible for uniform distribution of the reaction gases ($H_2$ and $O_2$) over the electrodes via flow channels or gas channels, dissipation of the heat and removal of the reaction products in the form of water from the cell arrangement, electrical connection of the cathode of a cell to the anode of the adjacent cell, and structural support of the thin and mechanically weak membrane-electrode assembly. Therefore, an ideal material for bipolar plates should have high electrical conductivity, low gas permeability, high corrosion resistance in acidic environments, high mechanical strength and low costs. The prior art here includes bipolar plates made of high-density graphite, which is chemically stable and has high corrosion resistance and high thermal/electrical conductivity. However, graphite plates are brittle, have low mechanical strength and incur high manufacturing costs since the flow field channels have to be machined. Accordingly, multiple studies have been conducted, in order to develop more suitable and less costly materials for the manufacture of bipolar plates, for example metals and composite materials. The use of metallic materials additionally enables the use of other manufacturing techniques, such as stamping, hydroforming, rubber pad forming, microelectroerosion, electrochemical microprocessing and additive manufacturing.

If electrical conductors are then introduced into the bipolar plate, the application of an electrical current to the electrical conductor can induce a magnetic field.

It is known here that magnetic fields have an influence on moving gas particles. If a gas particle X having mass m moves with speed v through the space and arrives in a magnetic field having strength and direction M, the gas particle will change direction and will be accelerated with acceleration a. This principle accelerates the reactant and can thus exert a force directed to the electrode surface. The amount of reactants available for the chemical reaction is thus increased.

In one embodiment, the at least one electrical conductor is a multitude of electrical conductors. The multitude of electrical conductors may run parallel here and may be connected to a common power source. The power source here may be independent of the fuel cell or may be fed at least partly via electrical current generated by the fuel cell.

In a further embodiment, the at least one electrical conductor includes a metal, especially copper, gold, or a metal of similar conductivity.

In a further embodiment, the at least one electrical conductor includes a graphene-coated carbon fiber. Carbon fibers have good electrical and thermal conductivity; electronegativity EN has a relatively high value at 2.50.

In a further embodiment, the at least one electrical conductor includes a high-temperature superconductor. High-temperature superconductors are materials having superconductivity which, unlike in the case of conventional superconductors, does not arise as a result of electron-photon interaction. These are not usually metallic materials, as is commonly the case, but ceramic materials. In general, superconductors are materials having electrical resistance that abruptly tends to zero or becomes immeasurably small, less than $1 \cdot 10^{-20} \Omega$, when the temperature goes below what is called transition temperature.

In a further embodiment, the bipolar plate body includes a ceramic. Ceramic refers to a multitude of inorganic nonmetallic materials that can be roughly subdivided into the types of earthenware, stoneware, porcelain and specialty compositions.

In a further embodiment, the bipolar plate body includes a carbon fiber-reinforced plastic. Carbon fiber-reinforced plastic is a composite material in which carbon fibers are embedded into a plastic matrix. The matrix serves to improve the bonding of the fibers and to fill the interstices. The matrix chosen is usually epoxy resin material. However, other thermosets or else thermoplastics are also possible matrix materials.

In a further embodiment, the bipolar plate body includes a carbon fiber-reinforced carbon. Carbon fiber-reinforced carbons are composite materials that consist entirely of carbon. Carbon fiber-reinforced carbon consists of carbon fibers of diameter about 5-10 µm embedded in a matrix of pure carbon. They impart high mechanical stability to the material. The carbon matrix absorbs external forces and distributes them within the structure.

In a further aspect, a fuel cell having an above-described bipolar plate is specified. The fuel cell also has a control unit. The control unit is intended to actuate the at least one electrical conductor. The actuation allows magnetic fields to be induced in a defined manner, especially also at different sites in the bipolar plate, or at different sites within a fuel cell stack. It is thus possible to model various application cases. The control unit here may be part of a control system. The magnetic field here is adjusted in reaction to a variation of various input parameters.

In one embodiment, the fuel cell is set up to be connectable via a first gas conduit to a cryogenic hydrogen-containing tank. In this connection, cryogenic is a term for substances, processes and properties associated with extremely low temperatures. The at least one electrical conductor is a high-temperature superconductor. The fuel cell is set up to interact thermally with the first gas conduit in such a way that a heatsink induced by the cryogenic hydrogen in the first gas conduit cools the high-temperature superconductor, and the fuel cell heats the cryogenic hydrogen by exposure of the first gas conduit to the waste heat arising from the operation of the fuel cell. What is meant by thermal interaction in this context is that a temperature gradient exists from the fuel cell to the cryogenic hydrogen in the first gas conduit. For this purpose, the first gas conduit may be guided through the bipolar plate body.

In a further aspect, a fuel cell stack is specified, having a multitude of the above-described fuel cells. A fuel cell stack here refers to a complex consisting of one or more planar single cells that are stacked one on top of another and are arranged in an electrical series connection. The stack construction is provided at either end with what are called current collector plates for collecting the electrical current and electrically separated from what are called the end plates by an insulation—usually in the form of a plate—that forms part of the stack construction. The end plates are disposed at either end of the stack construction and are usually connected to one another by tension rods. A proton exchange membrane fuel cell is a stack of electrochemical cell systems connected in series. Since the electrons must migrate from the anode of one cell to the cathode of the next cell, electrical conductivity through the plate is an important prerequisite. A further important requirement is low permeability for the reacting gases or for ions. The bipolar plates should remain chemically inert over a prolonged period of time. The bipolar plates should also be lightweight and be produced with the aid of mass production technologies.

In a further aspect, a process, especially an additive manufacturing process, for production of an above-described bipolar plate is specified. The process has the steps that follow. Firstly, an electrical conductor and a thermoplastic insulation material are provided. The electrical conductor is ensheathed with the thermoplastic insulation material using a printhead intended for production of a coaxial cable. The coaxial cable is laid to form a bipolar plate body, wherein the bipolar plate body has at least one gas flow channel on the first surface. If a voltage is then applied to the electrical conductor, the electrical conductor forms an electromagnetic field, the electromagnetic field being intended to accelerate a reactant at least partly in the direction of an electrode in contact with the bipolar plate.

In one embodiment, the electrical conductor comprises a multitude of electrical conductors. The multitude of electrical conductors here may run at least partly parallel to the first direction behind the first gas flow channel side wall and/or the second gas flow channel side wall. The multitude of electrical conductors here may be produced from the same or different materials.

In a further aspect, a method of operating an above-described fuel cell is specified, wherein the method has the steps that follow. A connection of the fuel cell to a cryogenic hydrogen-containing tank via a first gas conduit is provided. The cryogenic hydrogen is heated by exposure of the first gas conduit to the waste heat arising from the operation of the fuel cell, while the high-temperature superconductor is cooled by a heatsink induced by the cryogenic hydrogen. If a voltage is then applied to the high-temperature superconductor, the high-temperature superconductor forms an electromagnetic field, the electromagnetic field being intended to accelerate the reactant at least partly in the direction of the electrode.

In a further aspect, an aircraft having an above-described fuel cell is specified. An aircraft here is understood to mean, for example, a passenger aircraft, a helicopter, a drone, an airship or a glider.

The field of use of the fuel cell may also be extended to land vehicles or stationary mechanical engineering.

BRIEF DESCRIPTION OF THE DRAWINGS

A detailed discussion follows of working examples with reference to the appended drawings. The drawings are schematic and not to scale. Identical reference numerals relate to identical or similar elements.

DETAILED DESCRIPTION

Figure 1:
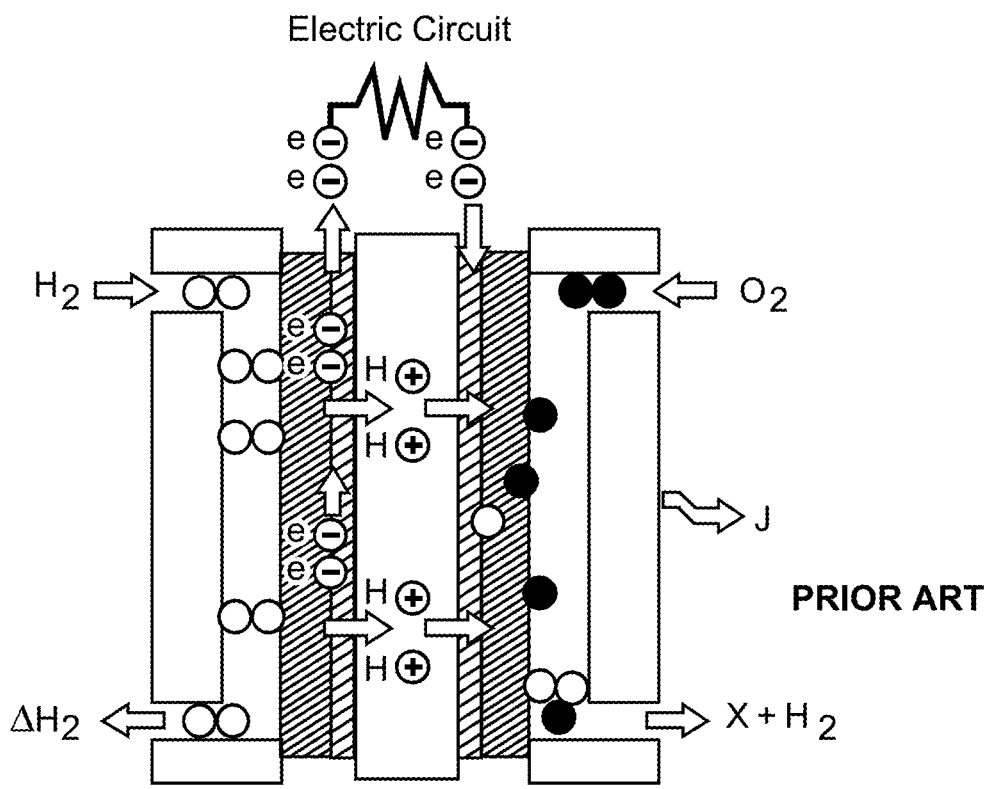
FIG. 1 is a schematic diagram of the basic construction of a fuel cell according to the prior art.

FIG. 1 shows a schematic diagram of the basic construction of a fuel cell according to the prior art. Fuel cells are one of the most promising sources of environmentally friendly energy for the future. These systems generate electrical energy by converting chemical energy stored in a fuel, for example hydrogen or methanol, by oxidation-reduction reactions. The principle of the fuel cell is based on the reaction equation $2 H_2 + O_2 = 2 H_2O$. The fuel cell is supplied with $H_2$, on the left, which flows around an anode and partly exits again as $\Delta H_2$. The hydrogen molecules of the $H_2$ break down to charged hydrogen atoms, hydrogen ions $H^+$, and release a free electron $e^-$. The free electrons $e^-$ flow as usable current via a conductor to the cathode. At the cathode, they form negative oxygen ions $O^{2-}$ with the oxygen atoms. The hydrogen ions $H^+$ migrate through the electrolyte to the cathode, where they combine with the oxygen ions to form water $H_2O$ and release heat J in the process.

Figure 2:
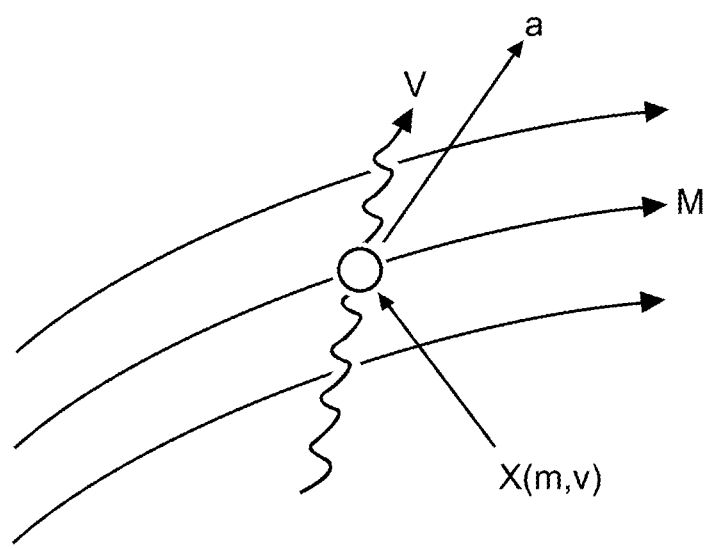
FIG. 2 is a schematic diagram of the influence of a magnetic field on a gas particle.

FIG. 2 shows a schematic diagram of the influence of a magnetic field on a gas particle. It is known that magnetic fields have an influence on moving gas particles. If a gas particle X with mass m moves through the space with speed v and arrives in a magnetic field having strength and direction M, the gas particle will change direction and be accelerated with acceleration a. This principle accelerates the reactant and hence exerts a force directed onto the electrode surface.

Figure 3:
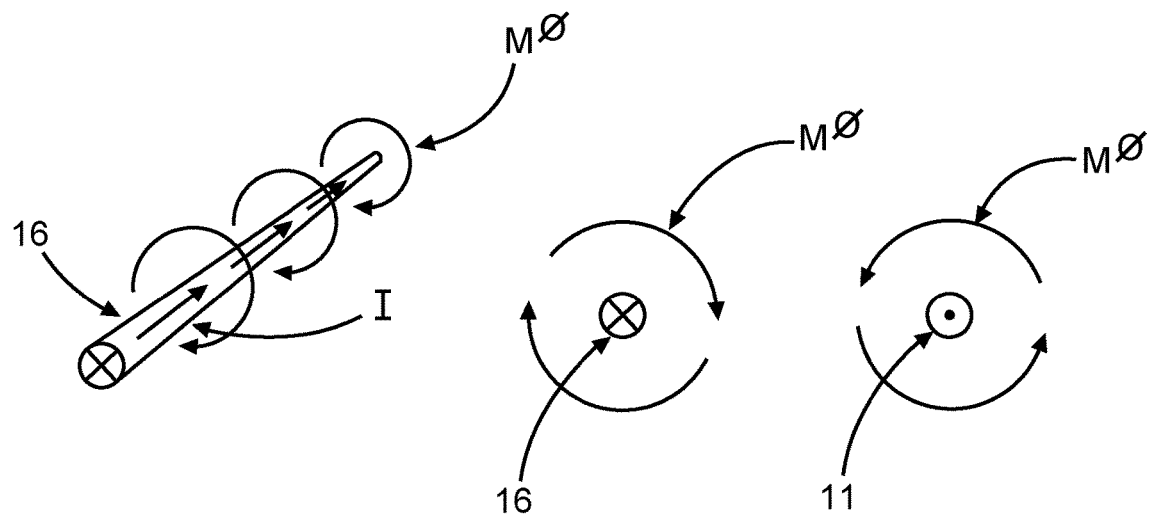
FIG. 3 is a schematic diagram of a magnetic field surrounding an electrical conductor.

FIG. 3 shows an electrical wire through which an electrical current flows. Viewed in flow direction, an electromagnetic field forms around the wire. The "right-hand screw" rule says that the electromagnetic field, viewed in flow direction, forms in a circular manner and in the clockwise sense around the wire. An electromagnetic effect on the reactants in the flow channels in the bipolar plate is thus exerted in addition to the gas flow pressure, in order to improve the flow to the electrodes.

Figure 4:
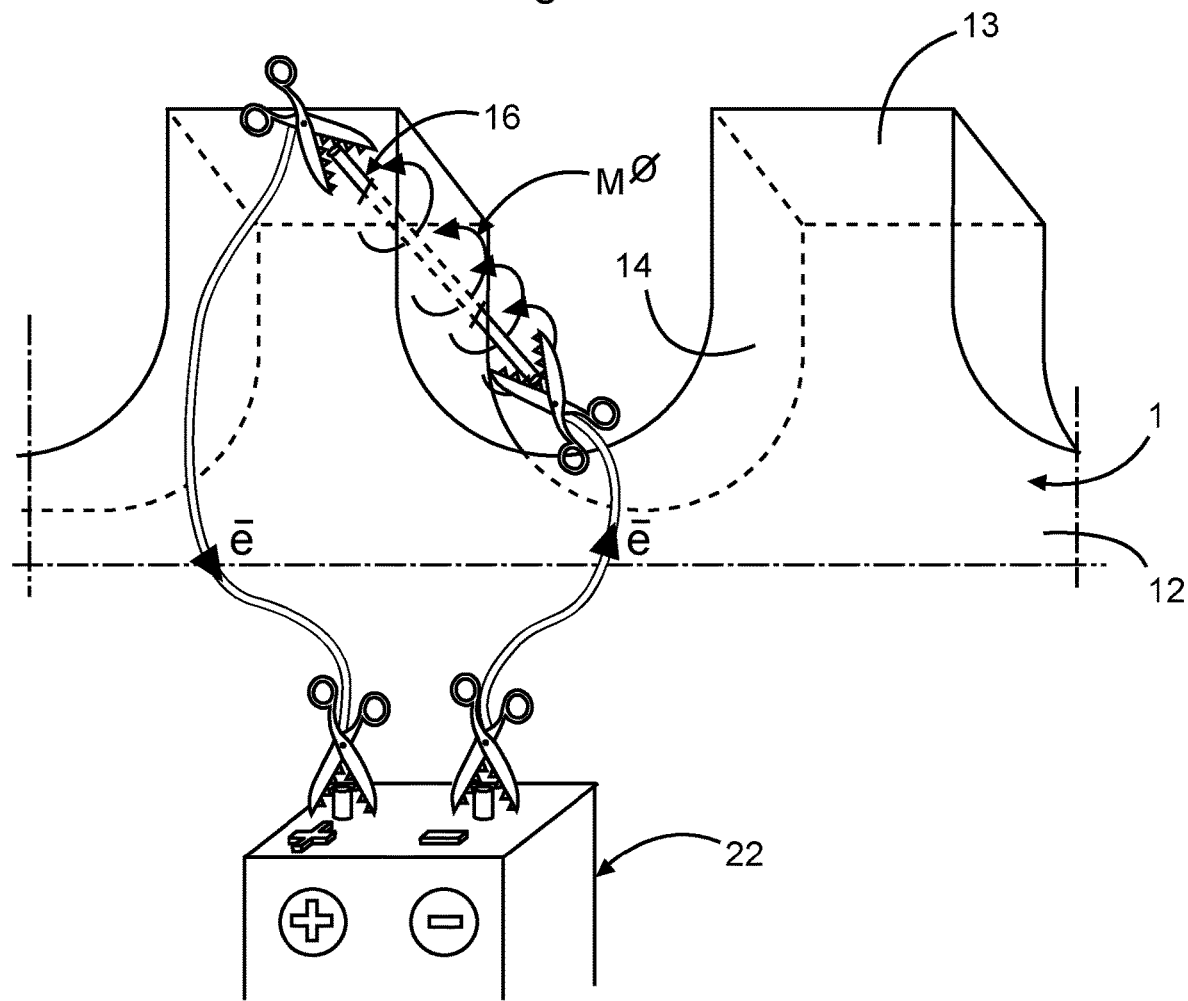
FIG. 4 is a schematic diagram of a bipolar plate for a fuel cell for generation of electrical current with an electrical conductor.

FIG. 4 shows a detail of a bipolar plate 10 with a gas flow channel 14 in the bipolar plate body 12 having a first surface 13. An electrical conductor 16 is embedded in the first gas flow channel side wall of the gas flow channel 14. This conductor may be brought into position by additive manufacture of the bipolar plate 12 with a coaxial printhead. The electrical conductor 12 here runs parallel to a gas flow channel, with electrical current and an electromagnetic field $M^\oplus$ acting in the gas flow channel 14 via a power source 22. Applying the right-hand screw principle, reactants present in the gas flow channel 14 will then be accelerated in the direction of the first surface 13.

Figure 5:
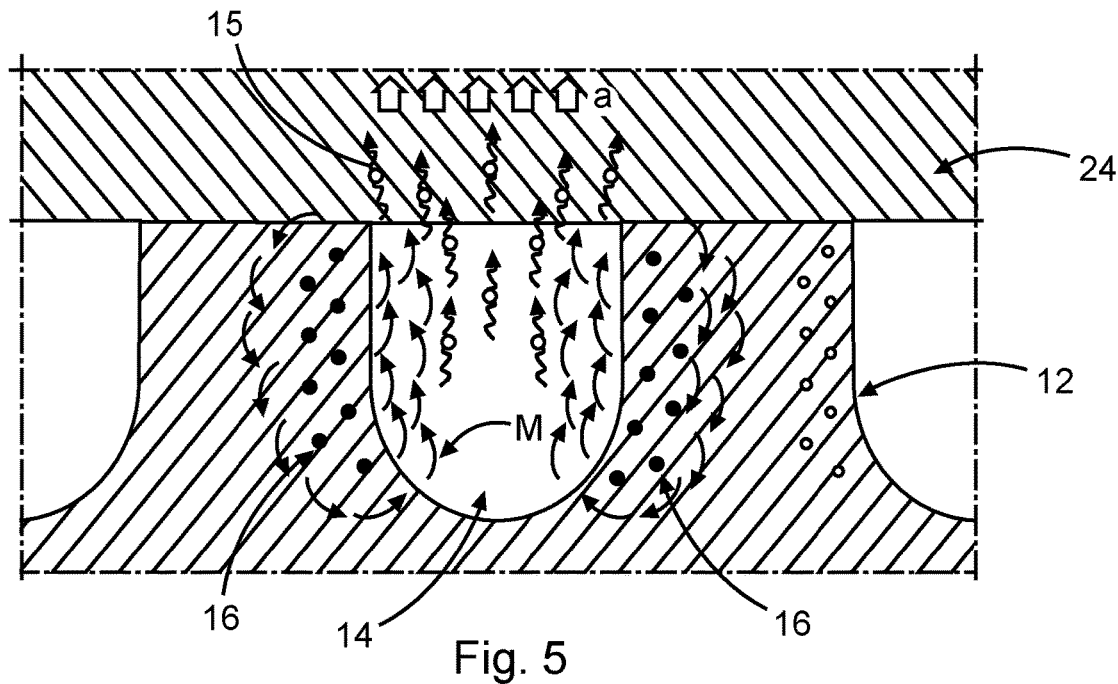
FIG. 5 is a schematic diagram of a bipolar plate according to FIG. 4 with an electrode and a multitude of electrical conductors.

FIG. 5 shows the same detail of a bipolar plate 10 with gas flow channel 14. Multiple electrical conductors 16 are now arranged in multiple rows in the channel side walls of the bipolar plate 10 along the gas flow channel 14 and form a "ribbon" of electrical conductors 16. When electrical current flows through these electrical conductors 16, multiple electromagnetic fields are formed, one around each electrical conductor 16. On each side of the "ribbon", an electromagnetic field aligned parallel to the "ribbon" is formed. Reactants 15 that move within the gas flow channel 14 are influenced and accelerated by the electromagnetic field. When the electrical conductors 16 are aligned at the correct angle and electrical current is flowing through them in the correct direction, the reactants 15 can be accelerated toward the electrode 24.

Figure 6:
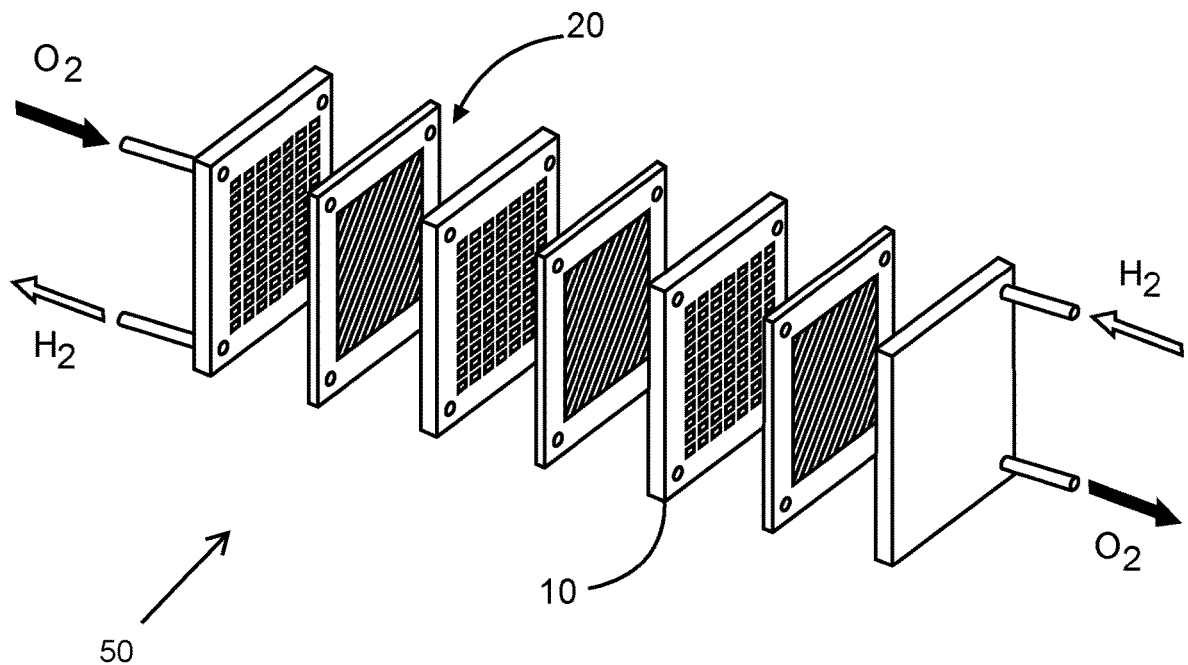
FIG. 6 is a schematic diagram of a fuel cell stack.

FIG. 6 shows a schematic diagram of a fuel cell stack 50. Since the maximum achievable cell voltage of a single cell is physically limited and in application is regularly below 1 V, typically in the range of 0.5 to 0.7 V, multiple single cells are connected in the form of an electrical series connection for establishment of higher voltages and powers. This complex, referred to hereinafter as stack construction, consists of one or more planar single cells that are stacked one on top of another and arranged in an electrical series connection. The stack construction is provided at either end with what are called current collector plates for collecting the electrical current and electrically separated from what are called the end plates by an insulation—usually in the form of a plate—that forms part of the stack construction. The end plates are disposed at either end of the stack construction and are usually connected to one another by tension rods. These tension rods enable the application of a tensioning force or compression force on the stack construction.

Figure 7:
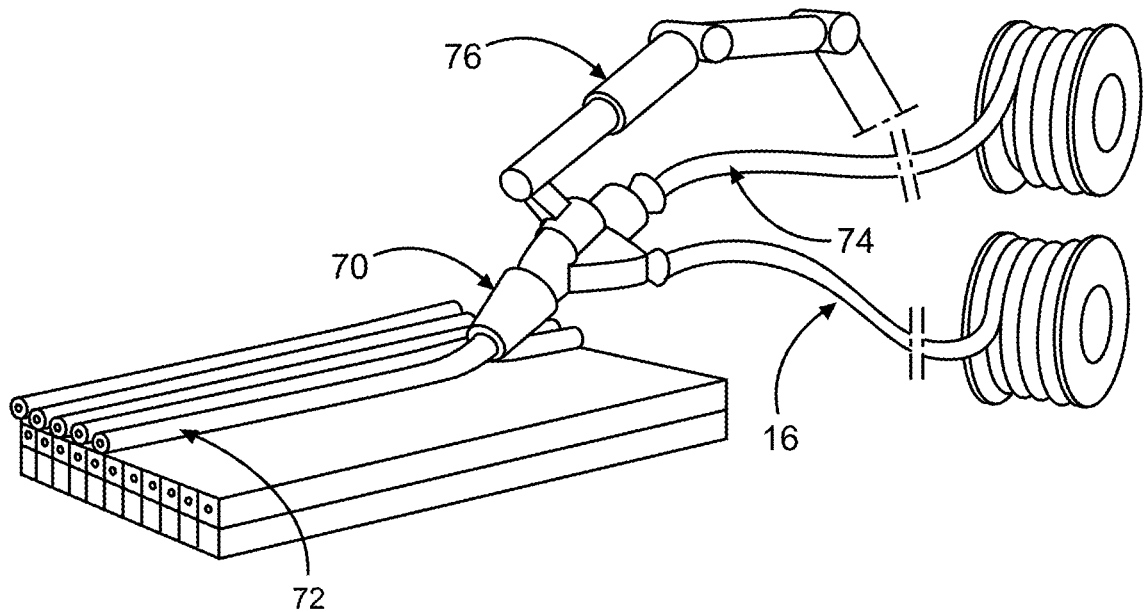
FIG. 7 is a schematic diagram of an apparatus for production of a bipolar plate.

FIG. 7 shows a schematic diagram of an apparatus for production of a bipolar plate. A coaxial printhead 70 is used to form a coaxial filament 72 from an electrical conductor 16 and a thermoplastic filament 74. A robot arm 76 is set up to lay the individual filaments alongside one another and hence to construct the bipolar plate body 12.

Figure 8:
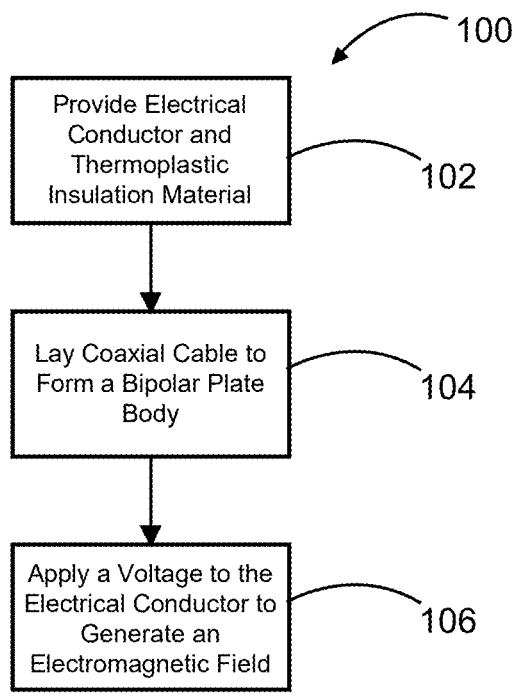
FIG. 8 is a schematic diagram of an additive manufacturing method for a bipolar plate.

The electrical conductor 16 may take the form of a continuous fiber and consist of one or more carbon fibers or of an electrical metal wire. FIG. 8 shows a schematic diagram of an additive manufacturing method for a bipolar plate. The method 100 has the steps that follow. Firstly, an electrical conductor 16 and a thermoplastic insulation material 74 are provided 102. The electrical conductor 16 is ensheathed with the thermoplastic insulation material via a printhead intended for production of a coaxial cable. The coaxial cable 72 is laid 104 to form a bipolar plate body 12, wherein the bipolar plate body 12 has at least one gas flow channel 14 on the first surface 13. If a voltage is then applied to the electrical conductor 16, the electrical conductor 16 forms an electromagnetic field 106, the electromagnetic field being intended to accelerate a reactant 15 at least partly in the direction of an electrode in contact with the bipolar plate 10.

Figure 9:
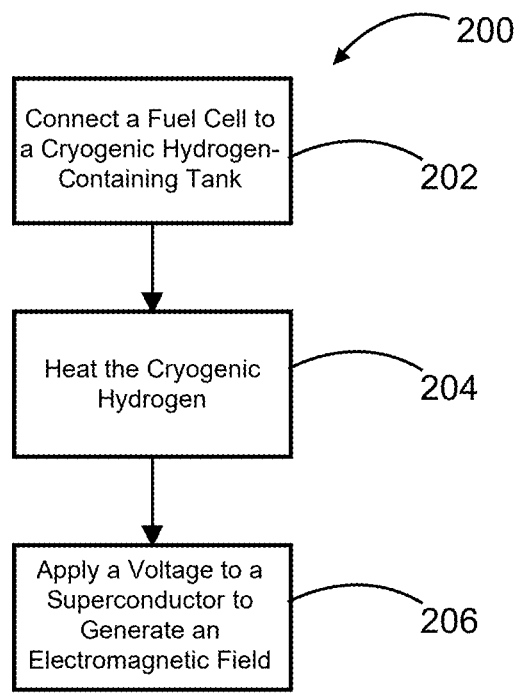
FIG. 9 is a schematic diagram of a method of operating a fuel cell.

The method 100 is preferably conducted using an apparatus described in FIG. 7, with the electrical conductor 16 comprising a multitude of electrical conductors. FIG. 9 shows a schematic diagram of a method 200 of operating a fuel cell, wherein the method has the steps that follow. A connection of the fuel cell 10 to a cryogenic hydrogen-containing tank via a first gas conduit is provided 202. The cryogenic hydrogen is heated 204 by exposure of the first gas conduit to the waste heat arising from the operation of the fuel cell 10, while the high-temperature superconductor is cooled by a heatsink induced by the cryogenic hydrogen. If a voltage is then applied to the high-temperature superconductor, the high-temperature superconductor forms an electromagnetic field 206, the electromagnetic field being intended to accelerate the reactant at least partly in the direction of the electrode.

The method 200 thus provides several benefits. The cryogenic hydrogen is heated via the heat from the fuel cell 10, which can reduce the necessary energy to be supplied for heating of the cryogenic hydrogen. At the same time, the heatsink induced by the cryogenic hydrogen advantageously lowers the temperature of the superconductor.

Figure 10:
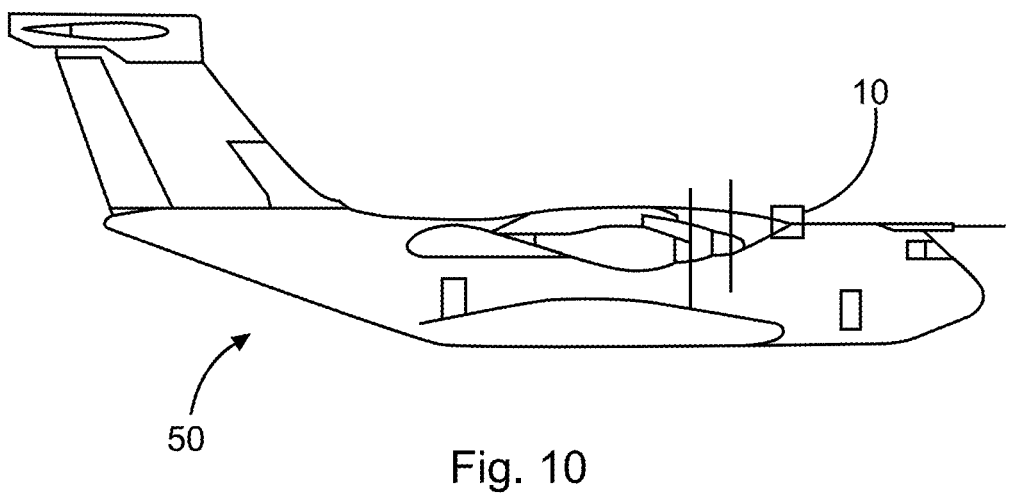
FIG. 10 is a schematic diagram of an aircraft having a fuel cell.

FIG. 10 shows a schematic diagram of an aircraft having a fuel cell. An aircraft here may be understood to mean a passenger aircraft, a helicopter, a drone, an airship or a glider.

The optimal position and number of electrical wires must be ascertained by calculations and subsequent tests. The electrical wires may be connected to a control unit that controls the operation of the fuel cell, including gas pressure, power required by the flight control, etc.

It should additionally be pointed out that "comprising" or "including" do not rule out other elements or steps, and "a" or "one" does not rule out a multitude. It should also be pointed out that features or steps that have been described with reference to one of the above working examples can also be used in combination with other features or steps of other above-described working examples. Reference numerals in the claims should not be regarded as a restriction.

The subject matter disclosed herein can be implemented in or with software in combination with hardware and/or firmware. For example, the subject matter described herein can be implemented in or with software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS 10 bipolar plate
12 bipolar plate body
13 first surface
14 gas flow channel
15 reactant
16 electrical conductor
20 membrane
22 power source
24 electrode
50 fuel cell stack
70 coaxial printhead
72 coaxial filament
74 thermoplastic filament
76 robot arm
100 manufacturing method
102 providing
104 laying
200 method of operating
202 providing
204 heating
300 aircraft

The invention claimed is:

1. A bipolar plate for a fuel cell for generation of electrical power, the bipolar plate comprising:
   a bipolar plate body that has a first surface and is set up to be in contact with an electrode via the first surface; and
   at least one electrical conductor;
   wherein the bipolar plate body has at least one gas flow channel on the first surface;
   wherein the gas flow channel defines a first gas flow channel side wall and an opposite second gas flow channel side wall;
   wherein the gas flow channel runs in a first direction and is configured for contacting a reactant with the electrode;
   wherein the at least one electrical conductor is set up to run parallel to the first direction within the bipolar plate body, behind the first gas flow channel side wall and/or the second gas flow channel side wall; and
   wherein, when a voltage is applied to the electrical conductor, the electrical conductor forms an electromagnetic field to accelerate the reactant at least partly in a direction of the electrode.

2. The bipolar plate according to claim 1, wherein the at least one electrical conductor comprises a plurality of electrical conductors.

3. The bipolar plate according to claim 1, wherein the at least one electrical conductor includes a metal.

4. The bipolar plate according to claim 3, wherein the metal is copper or gold.

5. The bipolar plate according to claim 1, wherein the at least one electrical conductor includes a high-temperature superconductor.

6. The bipolar plate according to claim 1, wherein the bipolar plate body includes a ceramic.

7. The bipolar plate according to claim 1, wherein the bipolar plate body includes a carbon fiber-reinforced plastic.

8. The bipolar plate according to claim 1, wherein the bipolar plate body includes a carbon fiber-reinforced carbon.

9. A fuel cell comprising:
   the bipolar plate according to claim 1; and
   a controller configured to actuate the at least one electrical conductor.

10. The fuel cell according to claim 9, wherein:
    the fuel cell is configured for connection via a first gas conduit to a cryogenic hydrogen-containing tank;
    the at least one electrical conductor is a high-temperature superconductor:
    the fuel cell is configured to thermally interact with the first gas conduit; and
    a heatsink induced by the cryogenic hydrogen in the first gas conduit cools the high-temperature superconductor; and
    the fuel cell heats the cryogenic hydrogen by exposure of the first gas conduit to waste heat arising from operation of the fuel cell.

11. A method of operating the fuel cell according to claim 10, the method comprising:

connecting the fuel cell to the cryogenic hydrogen-containing tank via the first gas conduit;

heating the cryogenic hydrogen by exposure of the first gas conduit to the waste heat arising from operation of the fuel cell;

cooling the high-temperature superconductor by a heatsink induced by the cryogenic hydrogen; and applying a voltage to the high-temperature superconductor to form the electromagnetic field to accelerate the reactant at least partly in the direction of the electrode.

12. A fuel cell stack comprising a plurality of the fuel cells according to claim 9.

13. An aircraft comprising the fuel cell stack according to claim 12.

14. An aircraft comprising the fuel cell according to claim 9.

15. The fuel cell according to claim 9, wherein:
the at least one electrical conductor comprises a plurality of electrical conductors;
the at least one electrical conductor includes a metal;
the at least one electrical conductor includes a high-temperature superconductor;
the bipolar plate body includes a ceramic;
the bipolar plate body includes a carbon fiber-reinforced plastic; or
the bipolar plate body includes a carbon fiber-reinforced carbon.

16. A fuel cell stack comprising a plurality of the fuel cells according to claim 15.

17. An aircraft comprising a fuel cell having the bipolar plate according to claim 1.

18. The bipolar plate according to claim 1, wherein the at least one electrical conductor includes a graphene-coated carbon fiber.

19. A method for production of a bipolar plate, the bipolar plate comprising:
a bipolar plate body that has a first surface and is set up to be in contact with an electrode via the first surface; and
at least one electrical conductor;
wherein the bipolar plate body has at least one gas flow channel on the first surface;
wherein the gas flow channel defines a first gas flow channel side wall and an opposite second gas flow channel side wall; and
wherein the gas flow channel runs in a first direction and is configured for contacting a reactant with the electrode; and
wherein the at least one electrical conductor is set up to run parallel to the first direction within the bipolar plate body, behind the first gas flow channel side wall and/or the second gas flow channel side wall;
the method comprising:
providing the at least one electrical conductor;
providing a thermoplastic insulation material;
ensheathing the at least one electrical conductor with the thermoplastic insulation material using a printhead to produce a coaxial cable;
laying the coaxial cable to form the bipolar plate body, which has the at least one gas flow channel on the first surface; and
applying a voltage to the electrical conductor to form an electromagnetic field to accelerate the reactant at least partly in a direction of the electrode.

20. The method according to claim 19, wherein:
the electrical conductor comprises a plurality of electrical conductors
the at least one electrical conductor includes a metal;
the at least one electrical conductor includes a high-temperature superconductor;
the bipolar plate body includes a ceramic;
the bipolar plate body includes a carbon fiber-reinforced plastic; or
the bipolar plate body includes a carbon fiber-reinforced carbon.

* * * * *